United States Patent
Gueorguiev

(10) Patent No.: US 6,476,513 B1
(45) Date of Patent: Nov. 5, 2002

(54) ELECTRICAL GENERATOR SYSTEM

(76) Inventor: Lubomir B. Gueorguiev, 815 E. Fremont Ave. # 26, Sunnyvale, CA (US) 94087

( * ) Notice: Subject to any disclaimer, the term of this patent is extended or adjusted under 35 U.S.C. 154(b) by 30 days.

(21) Appl. No.: 09/671,904

(22) Filed: Sep. 28, 2000

(51) Int. Cl.[7] .............................. F03D 9/00; H02P 9/04; F03B 13/10; H02K 13/00; H02K 23/36; H02K 27/24; H02K 3/02

(52) U.S. Cl. ............................. 290/55; 290/44; 290/43; 415/7; 310/127; 310/143; 310/148; 310/151

(58) Field of Search .............................. 290/43, 42, 44, 290/54, 55, 53; 415/907; 416/132 B, 85; 475/2.1, 7; 310/233, 229, 249, 128, 148, 143, 127, 133, 134–137, 147, 151

(56) References Cited

U.S. PATENT DOCUMENTS

| | | | | |
|---|---|---|---|---|
| 2,153,523 A | * | 4/1939 | Roberts | 290/44 |
| D117,513 S | | 11/1939 | Albers | |
| 2,190,887 A | * | 2/1940 | Schaeren | 171/206 |
| 3,789,251 A | * | 1/1974 | King | 310/239 |
| 4,140,959 A | * | 2/1979 | Powell | 307/46 |
| 4,213,057 A | | 7/1980 | Are | |
| 4,289,970 A | | 9/1981 | Deibert | |
| 4,396,852 A | * | 8/1983 | Hunt | 310/329 |
| 4,421,967 A | * | 12/1983 | Birgel et al. | 219/618 |
| 4,823,037 A | * | 4/1989 | Abukawa et al. | 310/154.22 |
| 4,992,691 A | * | 2/1991 | Mlynarz | 310/143 |
| 5,194,754 A | | 3/1993 | Milkodml | |
| 5,281,880 A | * | 1/1994 | Sakai | 192/48.2 |
| 5,289,041 A | * | 2/1994 | Holley | 290/44 |
| 5,497,039 A | * | 3/1996 | Blaettner et al. | 310/51 |
| 5,506,453 A | * | 4/1996 | McCombs | 290/44 |
| 5,660,527 A | | 8/1997 | Deering et al. | |
| 5,696,419 A | | 12/1997 | Rakestraw et al. | |
| 5,760,515 A | | 6/1998 | Burns | |
| 5,798,632 A | | 8/1998 | Muljadi | |
| 5,844,341 A | | 12/1998 | Spooner et al. | |
| 5,876,181 A | | 3/1999 | Shin | |
| 6,278,197 B1 | * | 8/2001 | Appa | 290/54 |

FOREIGN PATENT DOCUMENTS

DE 003844505 A1 * 7/1990

* cited by examiner

*Primary Examiner*—Nestor Ramirez
*Assistant Examiner*—Julio Gonzalez Ramirez

(57) ABSTRACT

An electrical wind generator system using multiple brushes for converting the kinetic energy of the wind into electrical energy. The electrical generator system includes a support frame assembly designed for coupling to a vertical support, a generating assembly coupled to the support frame assembly and designed for converting rotational motion into electrical energy, a pair of blade assemblies designed for converting kinetic energy of wind into rotational energy, each one of the blade assemblies being coupled to the generating assembly.

9 Claims, 3 Drawing Sheets

ELECTRICAL GENERATOR SYSTEM

BACKGROUND OF THE INVENTION

1. Field of the Invention

The present invention relates to wind generators and more particularly pertains to a new electrical wind generator system using multiple brushes for converting the kinetic energy of the wind into electrical energy.

2. Description of the Prior Art

The use of wind generators is known in the prior art. More specifically, wind generators heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,798,632; 5,660,527; 5,844,341; 5,696,419; 5,194,754; 5,876,181; 5,506,453; 5,760,515; 4,289,970; 2,153,523; 4,213,057; and U.S. Pat. No. Des. 117,513.

While these devices fulfill their respective, particular objectives and requirements, the aforementioned patents do not disclose a new electrical wind generator system using multiple brushes. The inventive device includes a support frame assembly designed for coupling to a vertical support, a generating assembly coupled to the support frame assembly and designed for converting rotational motion into electrical energy, a pair of blade assemblies designed for converting kinetic energy of wind into rotational energy, each one of the blade assemblies being coupled to the generating assembly.

In these respects, the electrical wind generator system using multiple brushes according to the present invention substantially departs from the conventional concepts and designs of the prior art, and in so doing provides an apparatus primarily developed for the purpose of converting the kinetic energy of the wind into electrical energy.

SUMMARY OF THE INVENTION

In view of the foregoing disadvantages inherent in the known types of wind generators now present in the prior art, the present invention provides a new electrical wind generator system using multiple brushes construction wherein the same can be utilized for converting the kinetic energy of the wind into electrical energy.

The general purpose of the present invention, which will be described subsequently in greater detail, is to provide a new electrical wind generator system using multiple brushes apparatus and method which has many of the advantages of the wind generators mentioned heretofore and many novel features that result in a new electrical wind generator system using multiple brushes which is not anticipated, rendered obvious, suggested, or even implied by any of the prior art wind generators, either alone or in any combination thereof.

To attain this, the present invention generally comprises a support frame assembly designed for coupling to a vertical support, a generating assembly coupled to the support frame assembly and designed for converting rotational motion into electrical energy, a pair of blade assemblies designed for converting kinetic energy of wind into rotational energy, each one of the blade assemblies being coupled to the generating assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new electrical wind generator system using multiple brushes apparatus and method which has many of the advantages of the wind generators mentioned heretofore and many novel features that result in a new electrical wind generator system using multiple brushes which is not anticipated, rendered obvious, suggested, or even implied by any of the prior art wind generators, either alone or in any combination thereof.

It is another object of the present invention to provide a new electrical wind generator system using multiple brushes which may be easily and efficiently manufactured and marketed.

It is a further object of the present invention to provide a new electrical wind generator system using multiple brushes which is of a durable and reliable construction.

An even further object of the present invention is to provide a new electrical wind generator system using multiple brushes which is susceptible of a low cost of manufacture with regard to both materials and labor, and which accordingly is then susceptible of low prices of sale to the consuming public, thereby making such electrical wind generator system using multiple brushes economically available to the buying public.

Still yet another object of the present invention is to provide a new electrical wind generator system using multiple brushes which provides in the apparatuses and methods of the prior art some of the advantages thereof, while simultaneously overcoming some of the disadvantages normally associated therewith.

Still another object of the present invention is to provide a new electrical wind generator system using multiple brushes for converting the kinetic energy of the wind, water, and steam into electrical energy.

Yet another object of the present invention is to provide a new electrical wind generator system using multiple brushes which includes a support frame assembly designed for coupling to a vertical support, a generating assembly coupled to the support frame assembly and designed for converting rotational motion into electrical energy, a pair of blade assemblies designed for converting kinetic energy of wind into rotational energy, each one of the blade assemblies being coupled to the generating assembly.

Still yet another object of the present invention is to provide a new electrical wind generator system using multiple brushes that double the amount of electricity generated per installation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
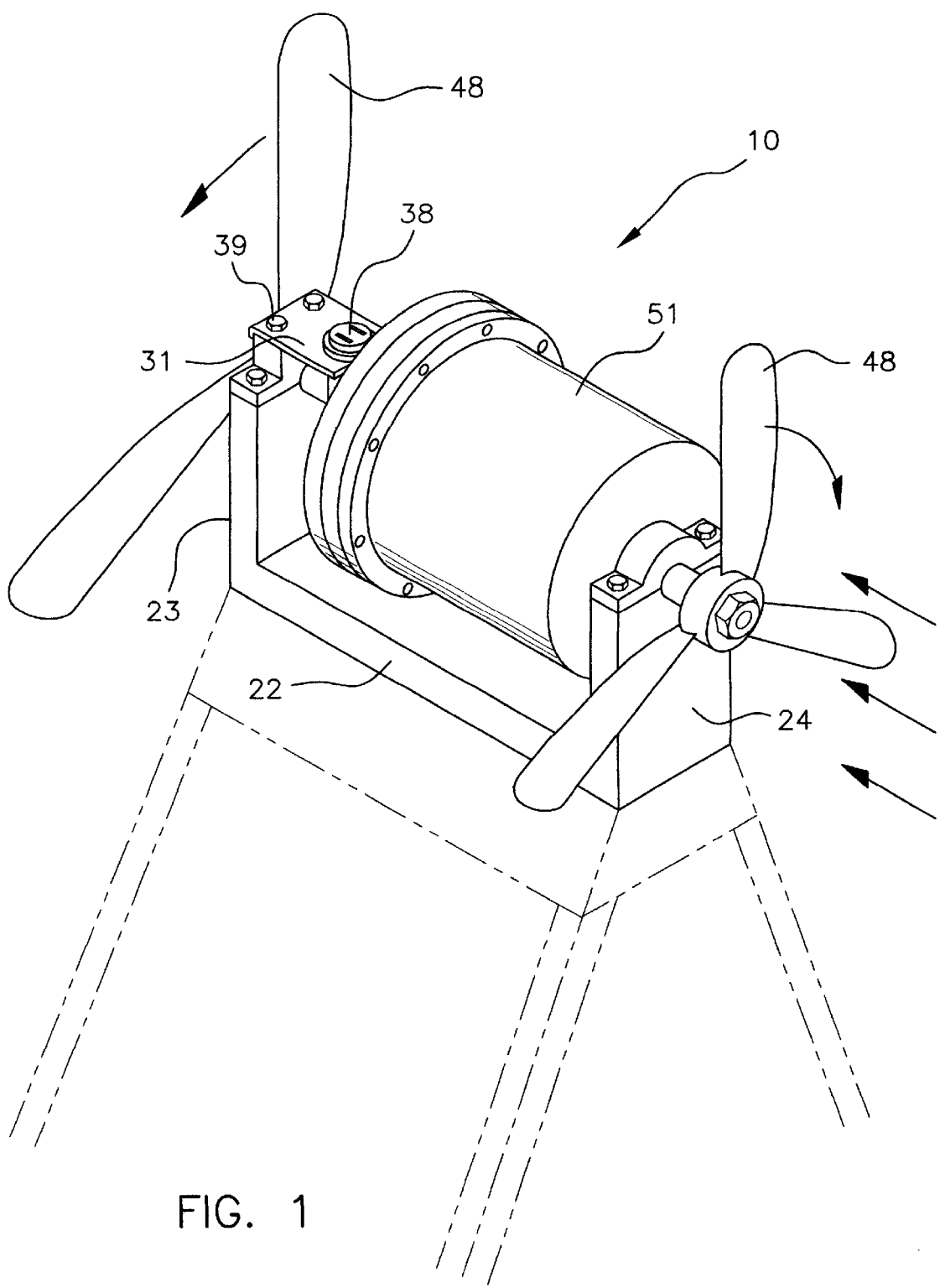
FIG. 1 is a schematic perspective view of a new electrical wind generator system using multiple brushes according to the present invention.
Figure 2:
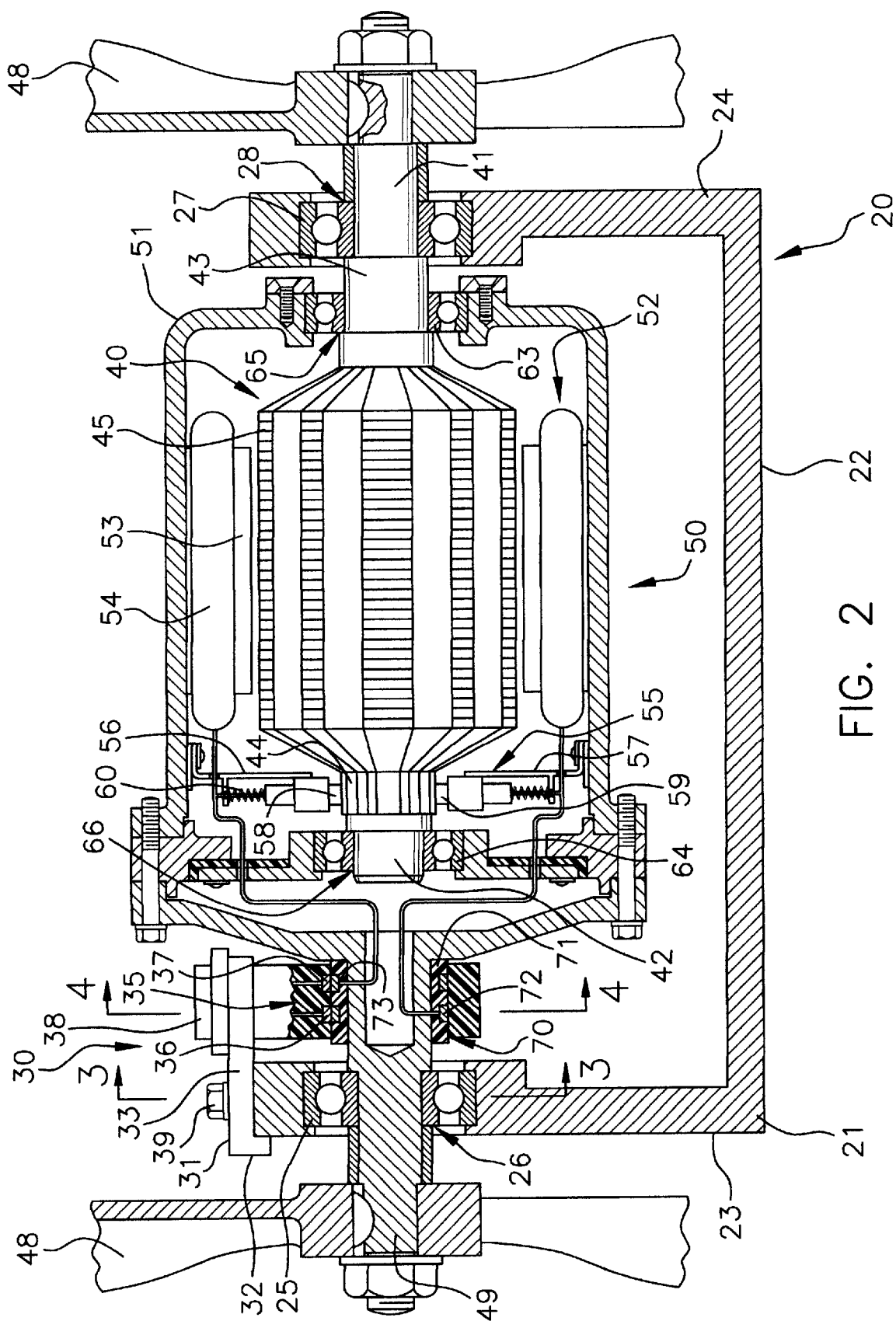
FIG. 2 is a schematic cross-sectional view of the present invention.
Figure 3:
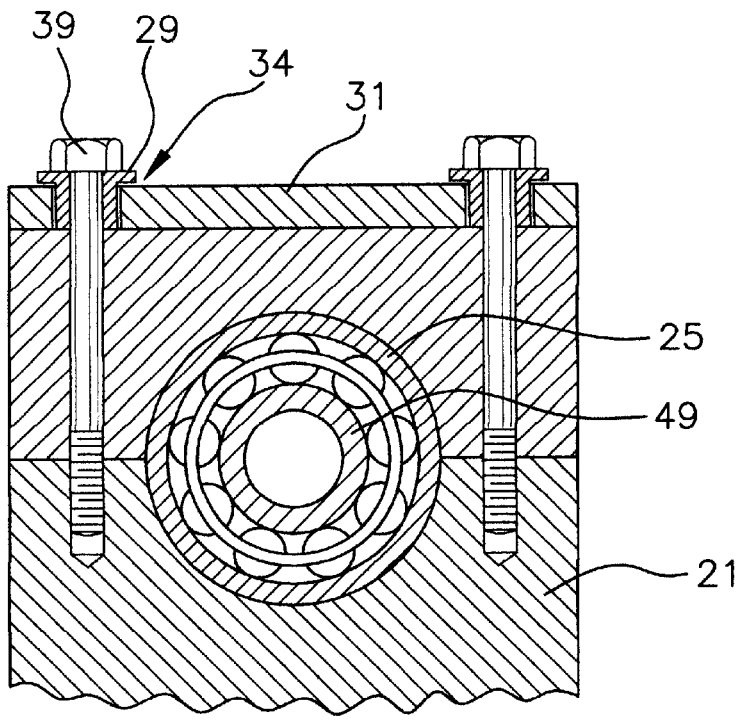
FIG. 3 is a schematic cross-sectional view of the bearing assembly of the present invention taken along line 3—3 of FIG. 2.
Figure 4:
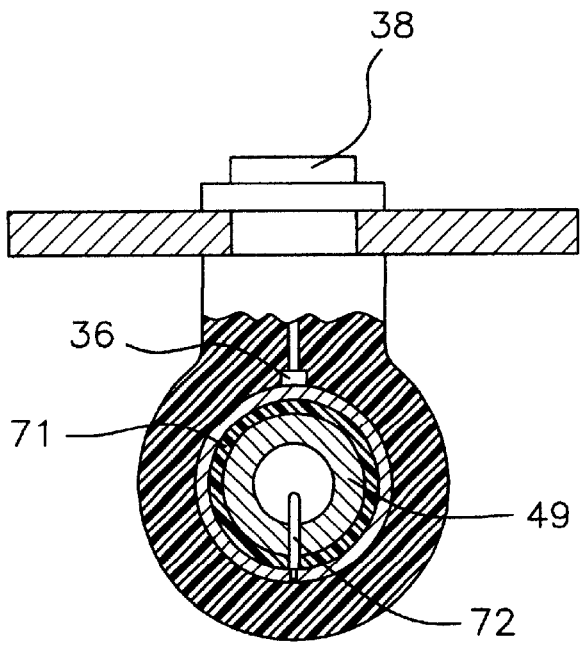
FIG. 4 is a schematic cross-sectional view of the annular contact assembly of the present invention taken along line 4—4 of FIG. 2.

With reference now to the drawings, and in particular to FIGS. 1 through 4 thereof, a new electrical wind generator system using multiple brushes embodying the principles and concepts of the present invention and generally designated by the reference numeral 10 will be described.

As best illustrated in FIGS. 1 through 4, the electrical wind generator system using multiple brushes 10 generally comprises a support frame assembly 20, a pair of blade assemblies 48, a rotor assembly 40, and a rotating stator assembly 50.

The support frame assembly 20 is designed for coupling the electrical wind generator system using multiple brushes 10 to a vertical support for elevating the electrical wind generator system using multiple brushes 10 above ground level.

The pair of blade assemblies 48 is designed for converting the kinetic energy of the wind into rotational energy. Each one of the blade assemblies 48 is coupled to an associated one of the rotor assembly 40 and the rotating stator assembly 50.

The rotor assembly 40 is coupled to a first one of the pair of blade assemblies 48.

The rotating stator assembly 50 is coupled to a second one of the pair of blade assemblies 48. The rotating stator assembly 50 substantially encloses the rotor assembly 40.

In an embodiment, the first one of the pair of blade assemblies 48 is designed for rotating in a first direction, and the second one of the pair of blade assemblies 48 being designed for rotating in a second direction opposite of the first direction. Thus the rotor assembly 40 rotates in a first direction and the rotating stator assembly 50 rotates in a second direction.

The rotor assembly 40 further comprises a shaft member 41, a commutator 44, and an armature 45.

The shaft member 41 includes a first end 42 and a second end 43. The first one of the pair of blade assemblies 48 is coupled to a first end 42 of the shaft member 41.

The commutator 44 is coupled to the second end 43 of the shaft 41. The shaft 41 extends through a medial portion of the commutator 44.

The armature 45 is positioned adjacent to the commutator 44 and extends towards the first end 42 of the shaft 41. The shaft 41 extends through a medial portion of the armature 45. The armature 45 is for generating electrical current as the armature 45 rotates with respect to the rotating stator 50.

The commutator 44 is electrically coupled to the armature 45. The commutator 44 provides a connection point for electrical current to flow from the armature 45.

The rotating stator 50 further comprises a rotating stator housing 51, a magnet assembly 52, a brush assembly 55, a bearing assembly 62, and a stator shaft 49.

The magnet assembly 52 is used for generating a magnetic field. The magnet assembly 52 is coupled to an interior surface of the rotating stator housing 51.

The brush assembly 55 is positioned to abut a surface of the commutator 44 for conducting electrical current.

The bearing assembly 62 is for supporting a shaft 41 while allowing the shaft 41 to rotate.

The stator shaft 49 is coupled to the second one of the pair of blade assemblies 48 for providing rotational energy to the rotating stator 50.

The magnet assembly 52 further comprises a pair of rare earth magnets 53 and a pair of bobbin assemblies 54.

Each one of the pair of rare earth magnets 53 is positioned on associated opposite sides of an interior surface of the rotating stator housing 51. Each one of the pair of rare earth magnets 53 provides an initial magnetic field.

Each one of the pair of bobbin assemblies 54 is positioned around an associated one of the rare earth magnets 53 such that each bobbin assembly 54 substantially encircles a circumference of the associated rare earth magnet 53. The bobbin assembly 54 provides electrical current and intensifies the magnetic field.

The brush assembly 55 further comprises a first 56 and second brush bracket 57, a first 58 and second brush member 59, and a pair of biasing assemblies 60.

Each one of the first 56 and second brush brackets 57 includes a first end coupled to an interior surface of the rotating stator housing 51. The first end of the first brush bracket 56 is positioned on a first side of the rotating stator housing 51. The first end of the second brush bracket 57 is positioned on a second opposite side of the rotating stator housing 51.

Each one of the first 58 and second brush members 59 is coupled to a second end of an associated one of the first 56 and second brush brackets 57.

Each one of the pair of biasing assemblies 60 urging an associated one of the first 58 and second brush members 59 to contact an associated side of a commutator 44. Each one of the biasing assemblies 60 is electrically coupled to an associated one of the first 58 and second brush members 59 for facilitating the flow of electrical current.

The bearing assembly 62 further comprises a first 63 and a second bearing member 64.

The first bearing member 63 is positioned at a first end of the rotating stator housing 51. The first bearing member 63 is substantially circular. A bore 65 extends through the first bearing member 63. The first bearing member 63 is for receiving an end 42 of a shaft 41 of an armature 45.

The second bearing member 64 positioned at a second end of the rotating stator housing 51. The second bearing member 64 is substantially circular. A bore 66 extends through the second bearing member 64. The second bearing member 64 is for receiving a second end 44 of the shaft 43 of the armature 45.

The rotating stator 50 further comprises an annular contact assembly 70 coupled to an exterior surface of the stator shaft 49. The annular contact assembly 70 is electrically coupled to the brush assembly 55 for facilitating the flow of electrical current from the rotating stator 50.

The annular contact assembly 70 further comprises an annular insulator member 71, and a first 72 and second annular contact member 73.

The annular insulator member 71 is positioned on an exterior surface of the stator shaft 49.

Each of the first 72 and second annular contact members 73 is electrically coupled to an associated first 58 and second brush member 59. Each of the first 72 and second annular contact members 73 is positioned on an exterior surface of the annular insulator 71. The first annular contact member 72 is positioned in a substantially spaced parallel orientation with the second annular contact member 73.

The annular insulator 71 provides electrical isolation between the first 72 and second annular contact members 73 and the stator shaft 49.

The support frame assembly 20 further comprises a frame member 21, a first 25 and second frame bushing 27 and a power outlet assembly 30.

The frame member 21 includes a horizontal base portion 22. The frame member 21 includes a first 23 and second vertical end portion 24. The first 23 and second vertical end portions 24 extend upwardly from an associated one of two opposite ends of the horizontal portion 22.

The first frame bushing 25 is for supporting the rotating stator assembly 50. The first frame bushing 25 is positioned adjacent to a top edge of the first vertical end portion 23. The first frame bushing 25 is substantially circular. The first frame bushing 25 includes a bore 26 extending therethrough. The first frame bushing 25 is for rotatably receiving a shaft 49 of the rotating stator 50.

The second frame bushing 27 is for supporting the rotor assembly 40. The second frame bushing 27 is positioned adjacent a top edge of the second vertical end portion 24. The second frame bushing 27 is substantially circular. The second frame bushing 27 includes a bore 28 extending therethrough. The second frame bushing 27 is for rotatably receiving a shaft 41 of the rotor assembly 40.

The power outlet assembly 30 is for facilitating the flow of electrical current from the rotating stator assembly 50 to an external current sink. The power outlet assembly 30 is coupled to the first vertical end portion 23 of the frame member 21.

In an embodiment the power outlet assembly 30 further comprises a mounting bracket 31, an annular contact assembly 35, a power socket 38, a pair of coupling members 39, and a pair of thimble members 29. The mounting bracket 31 includes a vertical extent 32 and a horizontal extent 33. The mounting bracket 31 is couplable to the first vertical end portion 23 of the frame member 21. The mounting bracket 31 is substantially L-shaped. The horizontal extent 33 includes a pair of apertures 34 extending therethrough. The annular contact assembly 35 is coupled to an underside of the horizontal extent 33. The annular contact assembly 35 is for facilitating the flow of electrical current from the first 72 and second annular contact members 73. The annular contact assembly 35 includes a first 36 and second brush member 37. Each one of the first 36 and second brush members 37 facilitates contact with an associated one of the first 72 and second annular contact member 73. The power socket 38 is coupled to an upper portion of the horizontal extent 33. The power socket 38 is electrically coupled to the annular contact assembly 35. The power socket 38 is designed for mating with a conventional power plug. Each one of the pair of coupling member 39 extends through an associated one of the apertures 34 into a bore in the first vertical end portion 23 for coupling the power outlet assembly 30 to the support frame assembly 20. The pair of thimble members 29 is used for aiding alignment of the coupling members 39 with the apertures 34 and bores.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electrical generator system comprising:
   a support frame assembly adapted for coupling to a vertical support;
   a generating assembly coupled to said support frame assembly, said generating assembly being adapted for converting rotational motion into electrical energy;
   a pair of blade assemblies adapted for converting kinetic energy of wind into rotational energy, each one of said blade assemblies being coupled to said generating assembly;
   wherein said generating assembly further comprises:
      a rotor assembly coupled to a first one of said pair of blade assemblies;
      a rotating stator assembly coupled to a second one of said pair of blade assemblies, said rotating stator assembly substantially enclosing said rotor assembly;
      wherein said first one of said pair of blade assemblies being adapted for rotating in a first direction, and said second one of said pair of blade assemblies being adapted for rotating in a second direction opposite of said first direction whereby said rotor assembly rotates in a first direction and said rotating stator assembly rotates in a second direction;

wherein said rotor assembly further comprises:

a shaft member having a first end and a second end, said first one of said pair of blade assemblies being coupled to a first end of said shaft member;

a commutator directly coupled to said second end of said shaft, said shaft extending through a medial portion of said commutator;

an armature positioned adjacent to said commutator and extending towards said first end of said shaft, said shaft extending through a medial portion of said armature, said armature being for generating electrical current as said armature rotates with respect to said rotating stator;

said commutator being electrically coupled to said armature, said commutator providing a connection point for electrical current to flow from said armature;

wherein said rotating stator further comprises:

a rotating stator housing;

a magnet assembly for generating a magnetic field, said magnet assembly being coupled to an interior surface of said rotating stator housing;

a brush assembly positioned to abut a surface of a commutator for conducting electrical current;

a bearing assembly for supporting a shaft while allowing said shaft to rotate;

a stator shaft having a first end and a second end, said first end being coupled to said second one of said pair of blade assemblies for providing rotational energy to said rotating stator, said second end of said stator shaft being directly coupled to said rotating stator housing;

wherein said magnet assembly further comprises:

a pair of rare earth magnets, each one of said rare earth magnets being positioned on associated opposite sides of an interior surface of said rotating stator housing, each one of said pair of rare earth magnets providing an initial magnetic field;

a pair of bobbin assemblies, each one of said bobbin assemblies being positioned around an associated one of said rare earth magnets such that each bobbin assembly substantially encircles a circumference of said associated rare earth magnet, said bobbin assembly providing electrical current and intensifying said magnetic field.

2. The electrical generator system of claim 1, wherein said brush assembly further comprises:

a first and second brush bracket, each one of said first and second brush brackets having a first end coupled to an interior surface of said rotating stator housing, said first end of said first brush bracket being positioned on a first side of said rotating stator housing, said first end of said second brush bracket being positioned on a second opposite side of said rotating stator housing;

a first and second brush member, each one of said first and second brush members being coupled to a second end of an associated one of said first and second brush brackets;

a pair of biasing assemblies, each one of said pair of biasing assemblies urging an associated one of said first and second brush members to contact an associated side of a commutator, each one of said biasing assemblies being electrically coupled to an associated one of said first and second brush members for facilitating the flow of electrical current.

3. The electrical generating system of claim 1, wherein said bearing assembly further comprises:

a first bearing member positioned at a first end of said rotating stator housing, said first bearing member being substantially circular, said first bearing member having a bore therethrough, said first bearing member being for receiving an end of a shaft of an armature;

a second bearing member positioned at a second end of said rotating stator housing, said second bearing member being substantially circular, said second bearing member having a bore therethrough, said second bearing member being for receiving a second end of said shaft of said armature.

4. The electrical generating system of claim 1, wherein said rotating stator further comprises:

an annular contact assembly coupled to an exterior surface of said stator shaft, said annular contact assembly being electrically coupled to said brush assembly for facilitating the flow of electrical current from said rotating stator.

5. The electrical generating system of claim 4, wherein said annular contact assembly further comprises:

an annular insulator member positioned on an exterior surface of said stator shaft;

a first and second annular contact member, each of said first and second annular contact members being electrically coupled to an associated first and second brush member, each of said first and second annular contact members being positioned on an exterior surface of said annular insulator, said first annular contact member being positioned in a substantially spaced parallel orientation with said second annular contact member;

said annular insulator providing electrical isolation between said first and second annular contact members and said stator shaft.

6. The electrical generation system of claim 1, wherein said support frame assembly further comprises:

a frame member, said frame member having a horizontal base portion, said frame member having a first and second vertical end portion, said first and second vertical end portions extending upwardly from an associated one of two opposite ends of said horizontal portion;

a first frame bushing for supporting said rotating stator assembly, said first frame bushing being positioned adjacent a top edge of said first vertical end portion, said first frame bushing being substantially circular, said first frame bushing having a bore extending therethrough, said first frame bushing being for rotatably receiving a shaft of said rotating stator;

a second frame bushing for supporting said rotor assembly, said second frame bushing being positioned adjacent a top edge of said second vertical end portion, said second frame bushing being substantially circular, said second frame bushing having a bore extending therethrough, said second frame bushing being for rotatably receiving a shaft of said rotor assembly.

7. The electrical generator system of claim 6, further comprising:

a power outlet assembly for facilitating the flow of electrical current from the rotating stator assembly to an external current sink, said power outlet assembly being coupled to said first vertical end portion of said frame member.

8. An electrical generator system comprising:
a support frame assembly adapted for coupling said electrical generator system to a vertical support for elevating said electrical generator system above ground level;
a generating assembly coupled to said support frame assembly, said generating assembly adapted for converting rotational motion into electrical energy;
a pair of blade assemblies adapted for converting the kinetic energy of the wind into rotational energy, each one of said blade assemblies being coupled to said generating assembly;
a rotor assembly coupled to a first one of said pair of blade assemblies;
a rotating stator assembly coupled to a second one of said pair of blade assemblies, said rotating stator assembly substantially enclosing said rotor assembly;
wherein said first one of said pair of blade assemblies being adapted for rotating in a first direction, and said second one of said pair of blade assemblies being adapted for rotating in a second direction opposite of said first direction whereby said rotor assembly rotates in a first direction and said rotating stator assembly rotates in a second direction;
said rotor assembly further comprises:
  a shaft member having a first end and a second end, said first one of said pair of blade assemblies being coupled to a first end of said shaft member;
  a commutator coupled to said second end of said shaft, said shaft extending through a medial portion of said commutator;
  an armature positioned adjacent to said commutator and extending towards said first end of said shaft, said shaft extending through a medial portion of said armature, said armature being for generating electrical current as said armature rotates with respect to said rotating stator;
  said commutator being electrically coupled to said armature, said commutator providing a connection point for electrical current to flow from said armature;
said rotating stator further comprises:
  a rotating stator housing;
  a magnet assembly for generating a magnetic field, said magnet assembly being coupled to an interior surface of said rotating stator housing;
  a brush assembly positioned to abut a surface of a commutator for conducting electrical current;
  a bearing assembly for supporting a shaft while allowing said shaft to rotate; and
  a stator shaft coupled to said second one of said pair of blade assemblies for providing rotational energy to said rotating stator;
said magnet assembly further comprises:
  a pair of rare earth magnets, each one of said rare earth magnets being positioned on associated opposite sides of an interior surface of said rotating stator housing, each one of said pair of rare earth magnets providing an initial magnetic field;
  a pair of bobbin assemblies, each one of said bobbin assemblies being positioned around an associated one of said rare earth magnets such that each bobbin assembly substantially encircles a circumference of said associated rare earth magnet, said bobbin assembly providing electrical current and intensifying said magnetic field;
said brush assembly further comprises:
  a first and second brush bracket, each one of said first and second brush brackets having a first end coupled to an interior surface of said rotating stator housing, said first end of said first brush bracket being positioned on a first side of said rotating stator housing, said first end of said second brush bracket being positioned on a second opposite side of said rotating stator housing;
  a first and second brush member, each one of said first and second brush members being coupled to a second end of an associated one of said first and second brush brackets;
  a pair of biasing assemblies, each one of said pair of biasing assemblies urging an associated one of said first and second brush members to contact an associated side of a commutator, each one of said biasing assemblies being electrically coupled to an associated one of said first and second brush members for facilitating the flow of electrical current;
said bearing assembly further comprises:
  a first bearing member positioned at a first end of said rotating stator housing, said first bearing member being substantially circular, said first bearing member having a bore therethrough, said first bearing member being for receiving an end of a shaft of an armature;
  a second bearing member positioned at a second end of said rotating stator housing, said second bearing member being substantially circular, said second bearing member having a bore therethrough, said second bearing member being for receiving a second end of said shaft of said armature;
  said rotating stator further comprises an annular contact assembly coupled to an exterior surface of said stator shaft, said annular contact assembly being electrically coupled to said brush assembly for facilitating the flow of electrical current from said rotating stator;
said annular contact assembly further comprises:
  an annular insulator member positioned on an exterior surface of said stator shaft;
  a first and second annular contact member, each of said first and second annular contact members being electrically coupled to an associated first and second brush member, each of said first and second annular contact members being positioned on an exterior surface of said annular insulator, said first annular contact member being positioned in a substantially spaced parallel orientation with said second annular contact member;
  said annular insulator providing electrical isolation between said first and second annular contact members and said stator shaft;
said support frame assembly further comprises:
  a frame member, said frame member having a horizontal base portion, said frame member having a first and second vertical end portion, said first and second vertical end portions extending upwardly from an associated one of two opposite ends of said horizontal portion;
  a first frame bushing for supporting said rotating stator assembly, said first frame bushing being positioned adjacent a top edge of said first vertical end portion, said first frame bushing being substantially circular, said first frame bushing having a bore extending therethrough, said first frame bushing being for rotatably receiving a shaft of said rotating stator;

a second frame bushing for supporting said rotor assembly, said second frame bushing being positioned adjacent a top edge of said second vertical end portion, said second frame bushing being substantially circular, said second frame bushing having a bore extending therethrough, said second frame bushing being for rotatably receiving a shaft of said rotor assembly; and a power outlet assembly for facilitating the flow of electrical current from the rotating stator assembly to an external current sink, said power outlet assembly being coupled to said first vertical end portion of said frame member.

9. The electrical generator system of claim 8, wherein said power outlet assembly further comprises:

a mounting bracket having a vertical extent and a horizontal extent, said mounting bracket being couplable to said first vertical end portion of said frame member, said mounting bracket being substantially L-shaped, said horizontal extent having a pair of apertures extending therethrough;

an annular contact assembly coupled to an underside of said horizontal extent, said annular contact assembly being for facilitating the flow of electrical current from said first and second annular contact members, said annular contact assembly having a first and second brush member, each one of said first and second brush members facilitating contact with an associated one of said first and second annular contact member;

a power socket coupled to an upper portion of said horizontal extent, said power socket being electrically coupled to said annular contact assembly, said power socket being adapted for mating with a conventional power plug;

a pair of coupling members, each coupling member extending through an associated one of said apertures into a bore in said first vertical end portion for coupling said power outlet assembly to said support frame assembly;

a pair of thimble members for aiding alignment of said coupling members with said apertures and bores.

* * * * *